United States Patent
Barbett et al.

(10) Patent No.: US 6,692,042 B2
(45) Date of Patent: Feb. 17, 2004

(54) PROFILED CLAMP AND SLEEVE JOINT COMPRISING SUCH A PROFILED CLAMP

(75) Inventors: Wolfgang Barbett, Rhede (DE); Markus Krämer, Mainhausen (DE); Rainer Heise, Siemerode (DE); Manfred Krüger, Büdingen (DE)

(73) Assignee: Rasmussen GmbH, Maintal (DE)

( * ) Notice: Subject to any disclaimer, the term of this patent is extended or adjusted under 35 U.S.C. 154(b) by 0 days.

(21) Appl. No.: 10/183,216

(22) Filed: Jun. 27, 2002

(65) Prior Publication Data

US 2003/0042739 A1 Mar. 6, 2003

(30) Foreign Application Priority Data

Jul. 5, 2001 (DE) .......................................... 101 32 631

(51) Int. Cl.[7] .................................................. F16L 25/00
(52) U.S. Cl. ........................ 285/420; 285/232; 285/349; 285/364; 285/365; 285/367
(58) Field of Search .......................... 285/104, 108, 285/113, 148.26, 231, 232, 339, 340, 365, 367, 364, 420, 349

(56) References Cited

U.S. PATENT DOCUMENTS

| | | | | |
|---|---|---|---|---|
| 1,974,780 A | * | 9/1934 | Mann | 285/364 |
| 2,457,077 A | | 12/1948 | Woolsey | |
| 3,116,078 A | * | 12/1963 | Scherer | 285/104 |
| 3,420,554 A | * | 1/1969 | Straub | 285/369 |
| 4,468,057 A | | 8/1984 | de Crombrugghe | |
| 4,664,422 A | * | 5/1987 | Straub | 285/340 |
| 4,842,309 A | * | 6/1989 | LaVene et al. | 285/319 |
| 6,142,536 A | * | 11/2000 | Wolfsdorf | 285/340 |
| 6,206,434 B1 | * | 3/2001 | Schreiter | 285/104 |
| 6,328,352 B1 | * | 12/2001 | Geppert et al. | 285/104 |

FOREIGN PATENT DOCUMENTS

| | | |
|---|---|---|
| DE | 1931751 | 1/1966 |
| DE | 295 19 221 U1 | 1/1996 |
| DE | 198 02 676 C1 | 5/1999 |
| DE | 198 00 283 C1 | 7/1999 |
| DE | 100 51 814 A1 | 5/2002 |
| EP | 0940618 | 9/1999 |
| GB | 2303677 | 2/1997 |

* cited by examiner

*Primary Examiner*—Lynne H. Browne
*Assistant Examiner*—Aaron Dunwoody
(74) *Attorney, Agent, or Firm*—Friedrich Kueffner

(57) ABSTRACT

A profiled clamp connecting two pipes has an articulated clamp strip having sidewalls and a transverse portion connecting the sidewalls and a tensioning closure around the clamp strip. A conical metal ring is arranged in the clamp strip and has a radially inner edge with teeth having free ends positioned on a circle with a diameter that is smaller than an inner diameter of the sidewalls. The conical ring has a radially outer edge resting in a bend between sidewall and transverse part. The first pipe has a widened end section with a conical transition and a radial flange engaging between the sidewalls. The second pipe has a smooth end section inserted into the widened end section. The outer flange diameter is greater than the inner sidewall diameter and smaller than the inner diameter of the transverse part. A seal rests between the smooth end section and the conical transition.

1 Claim, 1 Drawing Sheet

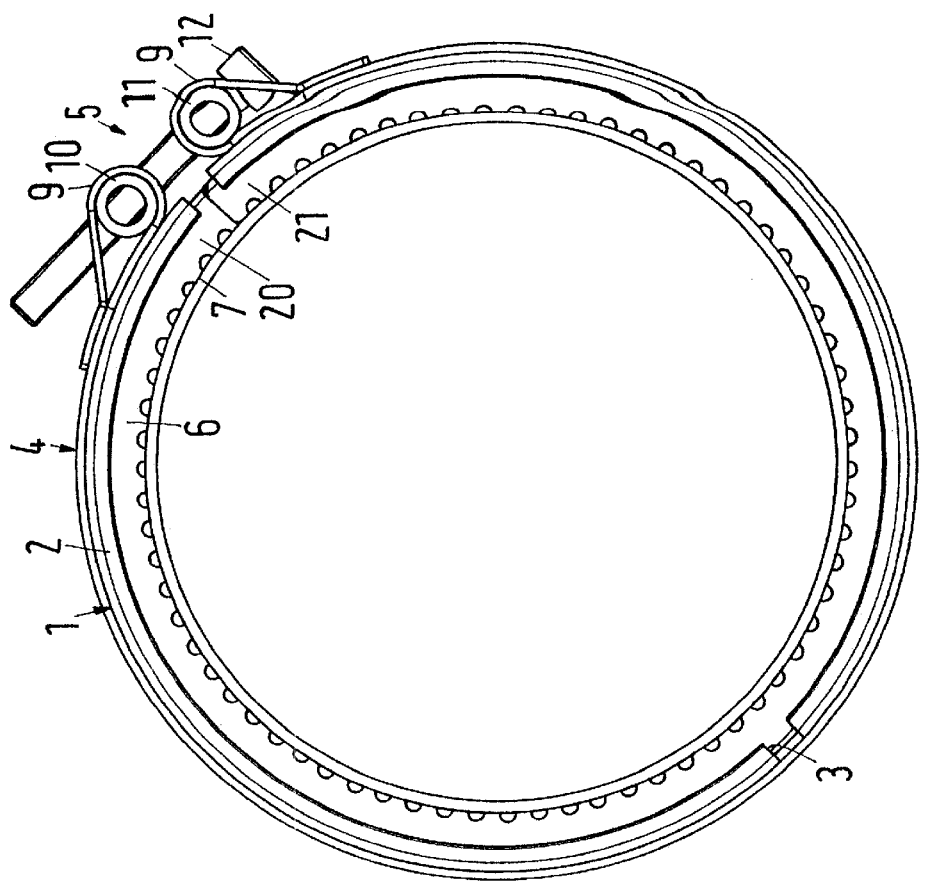
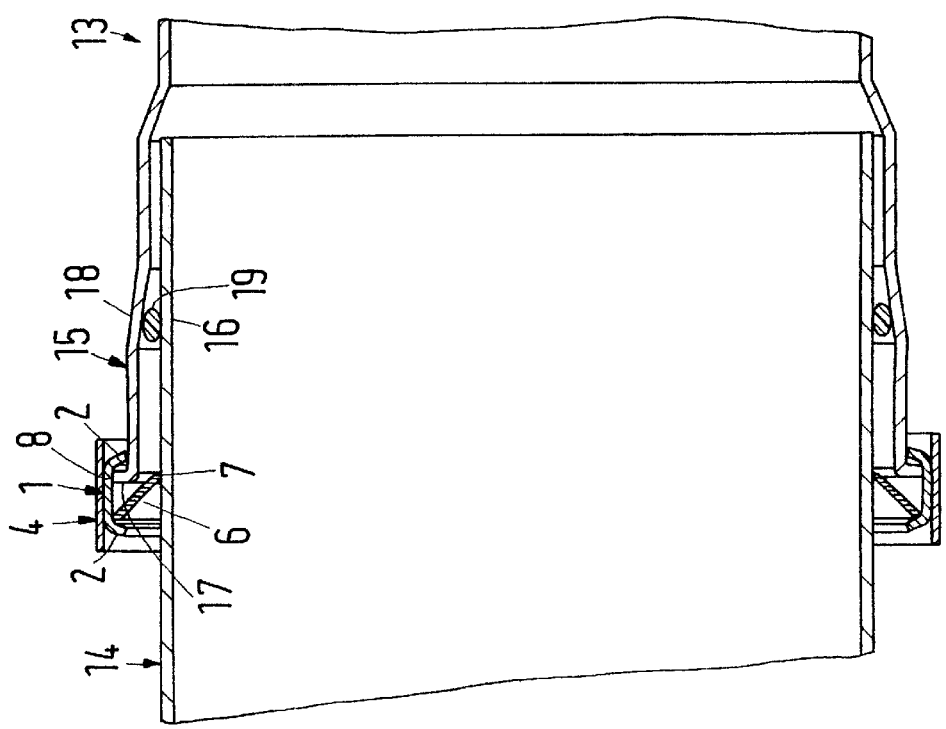

PROFILED CLAMP AND SLEEVE JOINT COMPRISING SUCH A PROFILED CLAMP

BACKGROUND OF THE INVENTION

1. Field of the Invention

The invention relates to a profiled clamp comprising an articulated clamp strip having an approximately trapezoidal cross-section and a tensioning closure for connecting to pipes or the like, and further relates to a sleeve joint comprising such a profiled clamp.

2. Description of the Related Art

Such profiled clamps are used for connecting pipes which have flanges at their ends, for example, as described in German patent 198 00 283 C1. They can also be used for connecting other structural parts, for example, a container and a container lid which are provided at their ends with flanges.

Moreover, pipe clamps are known which are used for joining smooth pipes of identical diameter and are provided at their inner side with conical open rings formed of a metal strip which are slanted toward one another and with their radially outer edge rest against the inner side of the transition from an axial transverse part into a respective radial sidewall of the clamp strip, while they engage with their radially inwardly positioned edge provided with teeth or claws the pipe material. One example of such a pipe coupling is described in German patent 198 02 676 C1.

In the case of sleeve joints of pipes, where the end section of a first pipe is widened and the end section of the second pipe is smooth so that the smooth end section is introduced into the widened end section, wherein a seal is arranged between the two end sections, such profiled clamps are not used because there are no flanges on the pipes and such pipe couplings are not used because of the different diameters of the end sections.

SUMMARY OF THE INVENTION

It is an object of the present invention to propose a profiled clamp of the aforementioned kind which can be used without significant extra expenditure also for sleeve joints and still provides a reliable connection. Moreover, a simple sleeve joint using such a profiled clamp is to be provided.

In accordance with the present invention, this is achieved in that in the clamp strip a conical ring, which has an interruption and is made of a metal band, is provided whose radially inner edge has teeth, whose free ends are positioned on a circle whose diameter is smaller than the inner diameter of the sidewalls of the clamp strip, wherein the radially outer edge of the ring rests against a bent portion between one of the sidewalls and the transverse part of the clamp strip connecting the sidewalls.

In this configuration, only the widened end portion of the first pipe of a sleeve joint must be provided with a radial flange and the profiled clamp must be provided additionally with a toothed ring. In this way, a simple and reliable, highly loadable sleeve joint is formed.

The sleeve joint according to the invention using the profiled clamp according to the invention then resides in that the first one of the two pipes, or the like, to be connected has a widened end section with a radially outwardly oriented flange engaging between the sidewalls of the clamp strip and further has a conical transition from a smaller to a larger diameter, and in that the second pipe has a smooth end section inserted into the widened end section whose outer diameter is smaller than the inner diameter of the widened end section of the first pipe, wherein the outer diameter of the flange is greater than the inner diameter of the sidewalls and smaller than the inner diameter of the transverse part of the clamp strip, and wherein a sealing ring is arranged between the inner end section and the conical transition of the inserted end sections.

Preferably, the clamp strip is surrounded by a tensioning band whose ends are formed as clamping jaws of the tensioning closure. In this connection, the tensioning band can be correspondingly stiff and have a thick wall so that it can withstand high axial forces of the pipes but so that a closure can be mounted in a simple way, in particular, an articulated closure that is easy to manipulate.

The invention and its embodiments will be explained in the following by means of a preferred embodiment illustrated in the drawing.

BRIEF DESCRIPTION OF THE DRAWING

In the drawing:

FIG. 1 shows an axial section of a profiled clamp according to the invention and the sleeve joint formed with the profiled clamp; and FIG. 2 is a side view of the profiled clamp according to the invention and of the sleeve joint.

DESCRIPTION OF THE PREFERRED EMBODIMENTS

According to FIGS. 1 and 2, the profiled clamp is comprised of a clamp strip 1 having a substantially trapezoidal cross-section whose sidewalls 2 are provided with an interruption 3 for achieving articulation. The profiled clamp further comprises a tensioning band 4 surrounding the clamp strip, a tensioning closure 5 in the form of a articulated closure cooperating with the tensioning band 4, and a ring 6 of a metal strip whose radially inner edge is provided with teeth 7. The free ends of the teeth 7 are positioned on a circle whose diameter is smaller than the inner diameter of the sidewalls 2 of the clamp strip 1. The radially outer edge of the ring 6 is positioned in a bent portion between one of the sidewalls and a transverse part 8 connecting the sidewalls 2 of the clamp strip 1. The tensioning band 4 has end portions which are bent back in the form of loops to form clamping jaws 9 which are fastened on the tensioning band 4, for example, by welding. In the loop-shaped clamping jaws 9, sleeve-shaped joint parts 10 and 11 are arranged which are penetrated by a clamping screw 12. For this purpose, the joint part 10 has a threaded bore and the joint part 11 has a bore without thread. Moreover, the clamping jaws 9 are provided with a slot extending across the greater part of the circumference of the joint part 10 and 11, respectively, and receiving the clamping screw in the radially outer leg of each loop.

The first pipe 13 of the pipes 13, 14 to be connected has a widened end section 15 and forms a so-called "sleeve pipe". The second pipe 14 has a smooth end section 16. The widened end section 15 of the pipe 13 has at its end an outwardly oriented flange 17 engaging between the sidewalls 2 of the clamp strip 1 whose outer diameter is greater than the inner diameter of the sidewalls 2 of the clamp strip 1 and smaller than the inner diameter of the transverse part 8 of the clamp strip 1. Moreover, the widened end section 15 has a conical transition 18 from a smaller to a greater diameter. The outer diameter of the inner smooth end section 16 is smaller than the inner diameter of the widened end section 15 of the pipe 13. Between the inner end section 16 and the conical transition 18 a sealing ring 19 of elastomer material is arranged. Behind the free end of the inner end section 16 the pipe 13 tapers to the same diameter as that of the end section 16 of the pipe 14.

After the opened profiled clamp has been placed about the flange 17 of the pipe 13 and the sealing ring 19 has been introduced into the pipe 13 up to the point of contact on the conical transition 18, the end section 16 of the pipe 14 is introduced into the end section 15. Subsequently, the profiled clamp is tightened by means of the tensioning closure 5. In this way, the overlapping free end sections 20, 21 of the ring 6 can be moved relative to one another in the sense of enlargement of the overlap in the circumferential direction. At the same time, the ring 6 is compressed somewhat radially so that its inner edge provided with the teeth 7 has the tendency to move in the direction toward the outer pipe 13 and to move minimally into it. When doing so, it entrains the pipe 14 in one direction and optionally also the pipe 13 in the other direction in the sense of a further displacement of the pipe 14 into the pipe 13 so that the sealing ring 19 is even more compressed and its sealing action is increased. With increasing pressure in the pipes 13, 14, the pipes 13, 14 would have the tendency to move away from one another. However, this is counteracted by the teeth 7 of the ring 6 engaging the material of the end section 16 and also by the fact that the ring 6 in this case has the tendency to become erect radially so that the teeth 7 would engage all the more tightly the material of the end section 16. Also, the one sidewall 2 of the clamp strip 1 engaging the flange 17 would prevent a movement of the pipe 13 away from the pipe 14.

The pipe 13 therefore only needs to be provided with the flange 17 and the conventional profiled clamp with the ring 6 in order to configure a sleeve joint. In this connection, the flange 17 can be simply provided by means of forming a bead in the case of a pipe 13 made of metal. The conventional profiled clamp itself does not require any modification.

While specific embodiments of the invention have been shown and described in detail to illustrate the inventive principles, it will be understood that the invention may be embodied otherwise without departing from such principles.

What is claimed is:

1. A sleeve joint joining a first pipe and a second pipe; the sleeve joint comprising:

a profiled clamp comprising an articulated clamp strip of a trapezoidal cross-section having sidewalls and a transverse part connecting the sidewalls;

wherein the profiled clamp comprises a tensioning closure disposed on the clamp strip;

wherein the profiled clamp comprises a conical ring provided with an interruption and made of a metal band arranged in the clamp strip;

wherein the conical ring has a radially inner edge provided with teeth, wherein the teeth have free ends positioned on a circle having a diameter that is smaller than an inner diameter of the sidewalls of the clamp strip;

wherein the conical ring has a radially outer edge resting in a bent portion between one of the sidewalls and the transverse part;

wherein the first pipe comprises a widened end section with a radially outwardly oriented flange engaging between the sidewalls of the clamp strip and having a conical transition from a smaller to a larger diameter of the first pipe;

wherein the second pipe has a smooth end section and is inserted into the widened end section;

wherein the outer diameter of the smooth end section is smaller than the inner diameter of the widened end section of the first pipe;

wherein the outer diameter of the flange is greater than the inner diameter of the sidewalls and smaller than the inner diameter of the transverse part of the clamp strip; and a sealing ring arranged between the smooth end section and the conical transition.

* * * * *